United States Patent
Carter, Jr.

[11] Patent Number: 6,024,325
[45] Date of Patent: Feb. 15, 2000

[54] ROTOR FOR ROTARY WING AIRCRAFT

[75] Inventor: Jay W. Carter, Jr., Burkburnett, Tex.

[73] Assignee: Cartercopters, LLC, Wichita Falls, Tex.

[21] Appl. No.: 09/004,498

[22] Filed: Jan. 8, 1998

Related U.S. Application Data

[60] Provisional application No. 60/035,034, Jan. 9, 1997.

[51] Int. Cl.[7] .................................................. B64C 27/52
[52] U.S. Cl. ............................................................ 244/17.25
[58] Field of Search ............................. 244/17.23, 17.25; 416/134 A, 135, 138, 139, 168 R, 228, 230, 238

[56] References Cited

U.S. PATENT DOCUMENTS

| | | |
|---|---|---|
| Re. 30,713 | 8/1981 | Ferris et al. . |
| 3,574,484 | 4/1971 | Lamb, Jr. . |
| 3,721,507 | 3/1973 | Monteleone . |
| 3,822,105 | 7/1974 | Jepson ........................................ 416/228 |
| 3,874,820 | 4/1975 | Fenaughty . |
| 3,999,888 | 12/1976 | Zincone . |
| 4,008,980 | 2/1977 | Noehren et al. . |
| 4,087,203 | 5/1978 | Ferris . |
| 4,150,920 | 4/1979 | Belko et al. . |
| 4,168,939 | 9/1979 | Schmitz et al. . |
| 4,222,709 | 9/1980 | Mouille . |
| 4,244,677 | 1/1981 | Noehren et al. . |
| 4,281,966 | 8/1981 | Duret et al. ........................... 416/134 A |
| 4,293,277 | 10/1981 | Aubry . |
| 4,299,538 | 11/1981 | Ferris et al. . |
| 4,332,525 | 6/1982 | Cheney, Jr. . |
| 4,339,230 | 7/1982 | Hill . |
| 4,345,876 | 8/1982 | Schwarz et al. . |
| 4,352,631 | 10/1982 | Buchs et al. . |
| 4,381,902 | 5/1983 | Head et al. . |
| 4,462,755 | 7/1984 | Ogle et al. . |
| 4,466,774 | 8/1984 | Cycon et al. . |
| 4,522,561 | 6/1985 | Carter, Jr. et al. . |
| 4,522,564 | 6/1985 | Carter, Jr. et al. . |
| 4,580,944 | 4/1986 | Miller . |
| 4,592,701 | 6/1986 | Hahn et al. . |
| 4,601,639 | 7/1986 | Yen et al. . |
| 4,778,343 | 10/1988 | Hahn et al. . |
| 4,792,280 | 12/1988 | Olsen et al. . |
| 4,880,355 | 11/1989 | Vuillet et al. . |
| 4,893,988 | 1/1990 | Sato . |
| 4,898,515 | 2/1990 | Beno et al. . |
| 5,092,738 | 3/1992 | Byrnes et al. . |
| 5,100,294 | 3/1992 | Crannage et al. . |
| 5,127,802 | 7/1992 | Carlson et al. . |
| 5,188,513 | 2/1993 | Byrnes . |
| 5,228,834 | 7/1993 | Yamamoto et al. . |
| 5,269,657 | 12/1993 | Garfinkle . |
| 5,332,362 | 7/1994 | Toulmay et al. . |
| 5,460,487 | 10/1995 | Schmaling et al. . |
| 5,462,409 | 10/1995 | Frengley et al. . |

*Primary Examiner*—Peter M. Poon
*Assistant Examiner*—Charles R. Ducker, Jr.
*Attorney, Agent, or Firm*—Felsman Bradley Vaden Gunter & Dillon, LLP; James E. Bradley

[57] ABSTRACT

A rotor for rotary wing aircraft has a tip to tip flex-beam spar and torsionally stiff hollow blades bonded to the spar throughout the tip-most portion of the blades. The spar spaced-apart spar caps which have a dual beam cross section in the region not bonded to the blades so that the spar is twistable for pitch control. The rotor spindle and controls pass through a central hole between the spar caps. An intermediate section of the rotor has shear webs bonded above and below spaced-apart spar caps, providing a stiff box beam cross section. The spar caps join each other outboard of the intermediate section. The collective control for pitch change employs a coil spring mounted between a pitch horn and a hub.

14 Claims, 7 Drawing Sheets

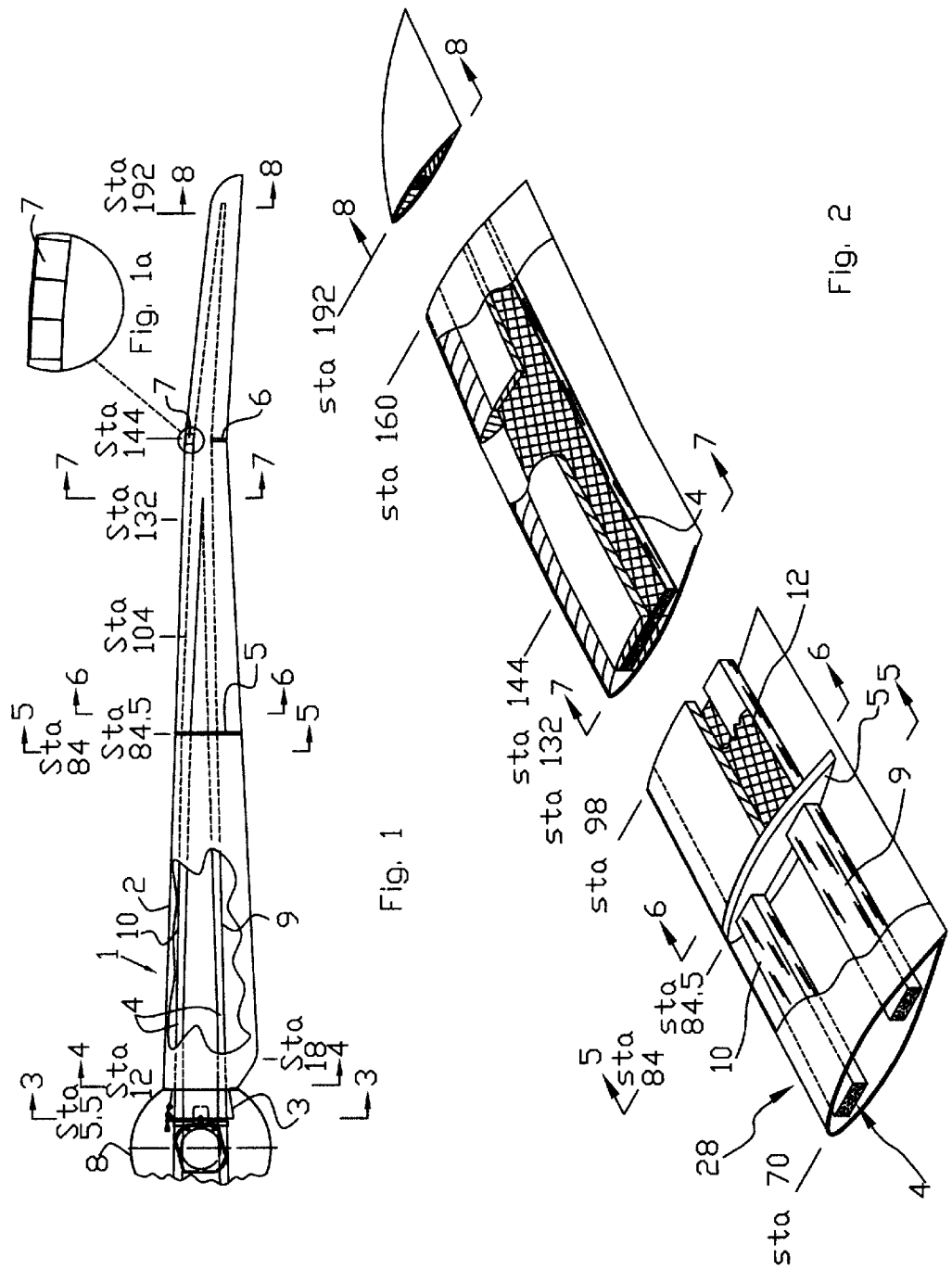

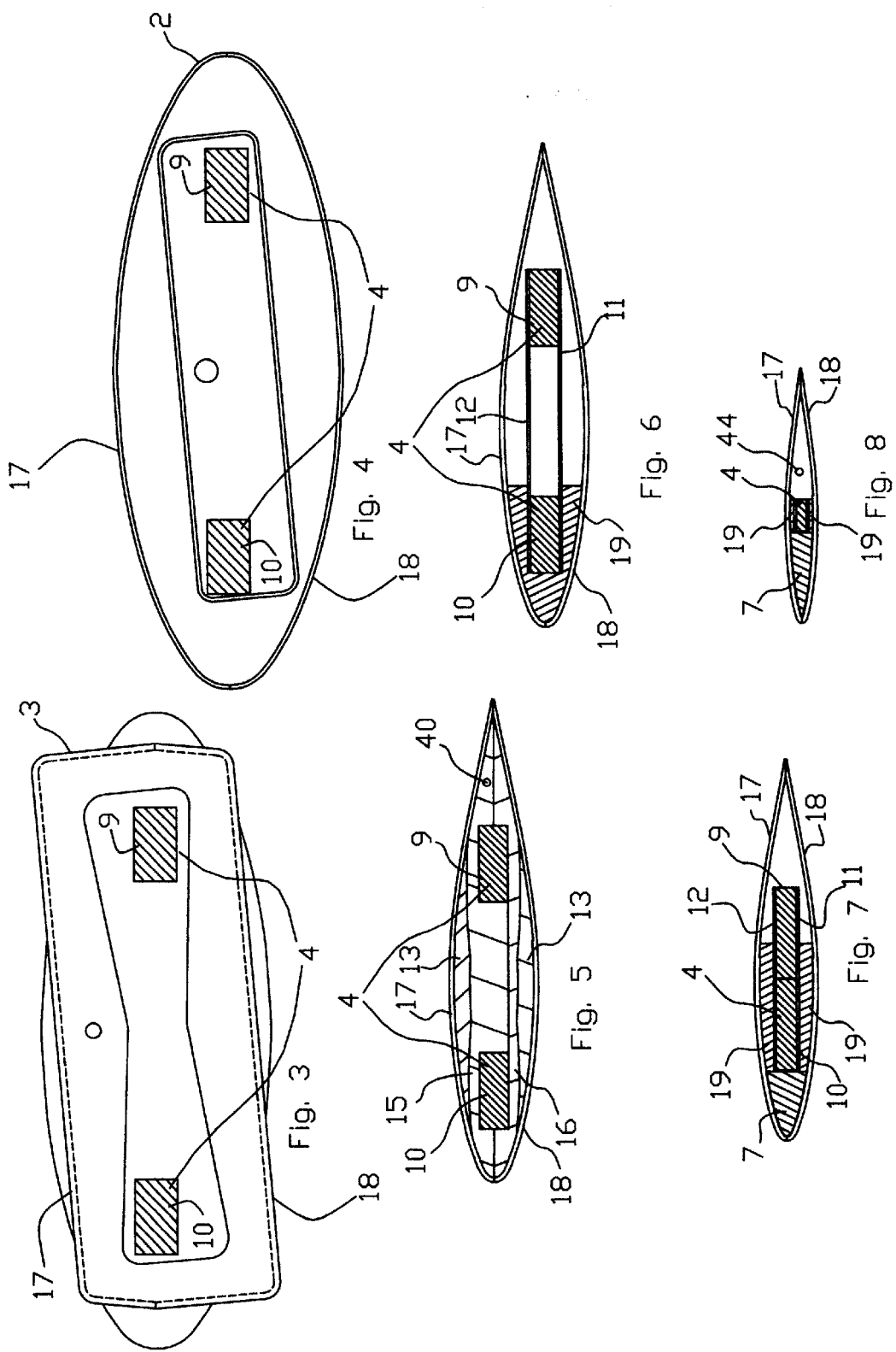

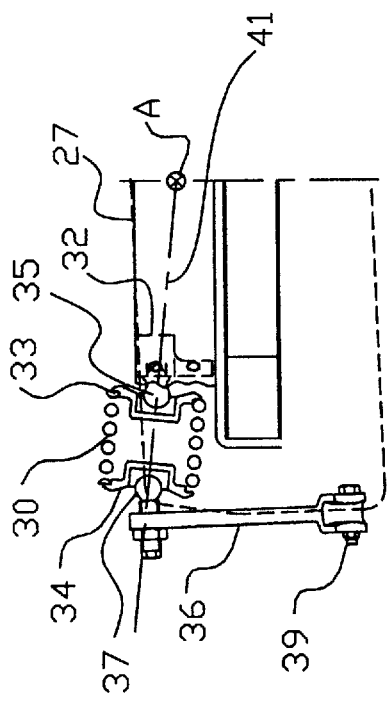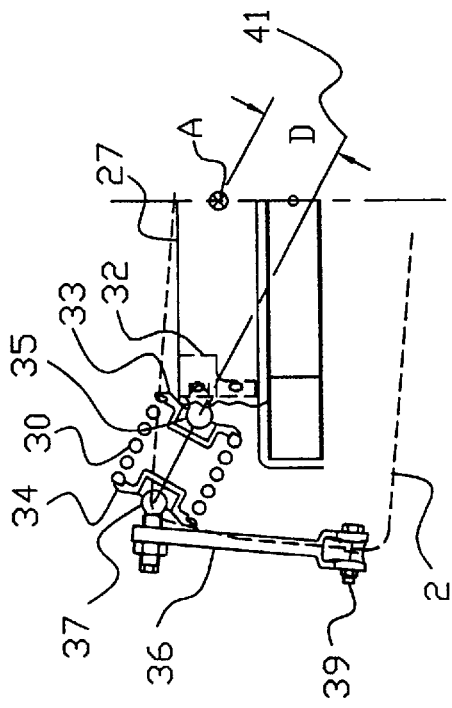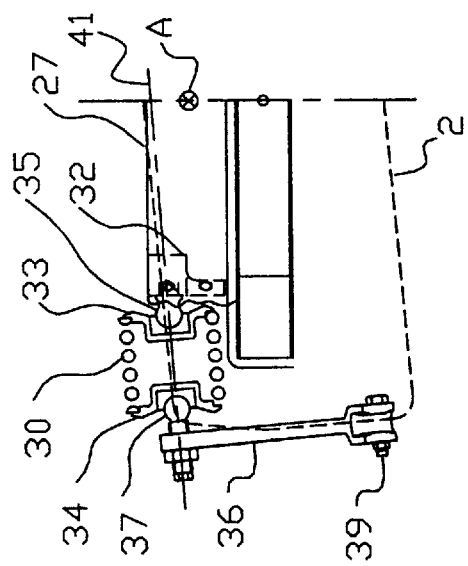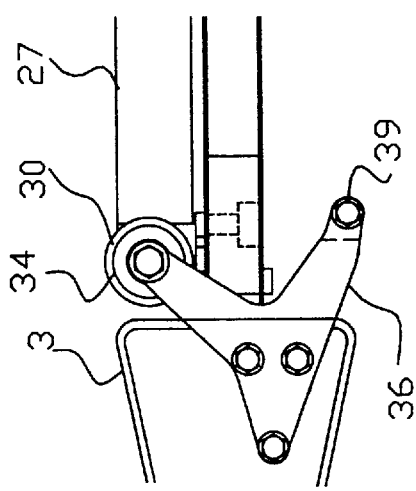

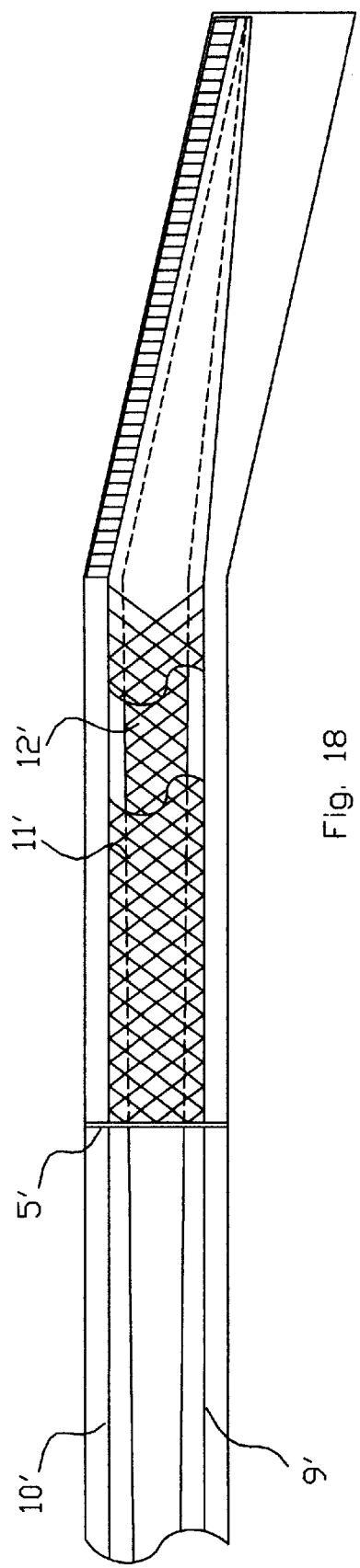

//ROTOR FOR ROTARY WING AIRCRAFT

This application claims the benefits of provisional patent application Ser. No. 60/035,034, filed Jan. 9, 1997.

TECHNICAL FIELD

This invention relates to fluid reaction surfaces having resiliently mounted non-rigid working members, more specifically to an improved two-bladed rotor for rotary wing aircraft, especially gyroplanes.

BACKGROUND ART

Conventional two-bladed flex-beam rotors have rectangular spar cross-sections (see for example U.S. Pat. No. 4,332,525) such that the spar is broad chordwise to provide high in-plane stiffness. This raises the in-plane natural frequency above the range excited by rotor rotation. The spar is relatively thin and flexible in the out-of-plane direction to reduce bending stresses on the spar root due to coning changes.

There are several problems with the rectangular cross section design. First, the rectangular cross section is structurally inefficient since the center of the beam is lightly loaded in in-plane bending. Second, it is desirable to have a large hole in the center of the rotor through which the rotor head may pass so that the rotor mounting and control is from above. Such a hole in a spar with a rectangular cross section leads to stress concentration around the hole (see U.S. Pat. No. 4,008,980). A two-element cross section is used in U.S. Pat. No. 4,299,538, but it is for the purpose of supporting the entire rotor by the pitch control bearings, a technique that will not work for a teetering rotor.

The recent prior art of rotors has been developed primarily for helicopter applications in which the rotor is powered full time, as opposed to gyrocopters or gyroplanes in which the rotor is not powered or is powered only prior to takeoff. While the spar cross section of the present invention is advantageous for both helicopters and gyroplanes, some of the requirements of the two applications are different. It is desirable for gyroplanes to have jump takeoff capability, in which the rotor is spun up on the ground to a high rotational speed (much higher than is used for takeoff in helicopters) with zero blade angle of attack, then vertical takeoff is performed by increasing the blade angle of attack. The high rotational rate required for jump takeoff requires a rotor with higher in-plane stiffness than is required for helicopters, since the stiffness required to maintain a natural frequency higher than the maximum rotation rate (required in two-bladed rotors) increases with the square of the rotation rate.

To increase the height of the jump takeoff, the rotational inertia of the blade must be increased. One way to increase the rotational inertia is by increasing rotation rate, but the rotation rate is limited by the rotor tip speed which cannot exceed the speed of sound. Another way is with tip weights. However, tip weights that double the rotor rotational inertia also double the in-plane stiffness required to maintain a natural frequency higher than the maximum rotation rate. While some helicopter rotors have tip weights providing inertia to improve their autorotation capability (see U.S. Pat. No. 5,462,409), gyroplane rotors need much heavier tip weights to achieve the inertia required for jump takeoff over obstacles as high as 50 feet.

Tip weights must be in the leading edge of the tip to maintain the correct chordwise balance. Since the rotor blade spar is behind the tip weights, a straight rotor blade centrifugal force exerts a large in-plane bending moment around the spar. The prior art disclosed tip sweep for aerodynamic or acoustic reasons (see U.S. Pat. Nos. 3,721,507, 4,168,939, and 5,332,362) but did not teach the optimal angles of sweep or location of sweep to solve this structural problem.

DISCLOSURE OF INVENTION

Accordingly, a primary object of the invention is an improved rotor having very high in-plane stiffness and low out-of-plane stiffness.

Another primary object is a rotor having a hole at its center large enough to pass the rotor head.

A further primary object is a rotor which can carry dense weights in the tip leading edge without excessive stresses.

A further primary object is a rotor which has rotational inertia to achieve a 50 foot vertical jump takeoff.

A further primary object is a rotor which will remain stable at low rotation rates due to high rotational inertia.

The rotor blade of this invention has a tip to tip flex-beam spar and torsionally stiff hollow blades bonded to the spar throughout the tip-most portion of the blades. The spar has an I-beam or C-beam cross section in the region not bonded to the blades so that the spar is twistable for pitch control.

The above as well as additional objects, features, and advantages of the invention will become apparent in the following detailed description.

BRIEF DESCRIPTION OF THE DRAWINGS

FIG. 1 is a top view of one half of a rotor constructed in accordance with this invention.

FIG. 1a is an enlarged partial view of some of the tip weights of the rotor of FIG. 1.

FIG. 2 is an isometric view, partially broken away, of one half of the rotor of FIG. 1.

FIG. 3 is a cross section through the rotor of FIG. 1, taken along the line 3—3 of FIG. 1.

FIG. 4 is a cross section through the rotor of FIG. 1, taken along the line 4—4 of FIG. 1.

FIG. 5 is a cross section through the rotor of the rotor of FIG. 1, taken along the line 5—5 of FIGS. 1 and 2.

FIG. 6 is a cross section through the rotor of FIG. 1, taken along the line 6—6 of FIGS. 1 and 2.

FIG. 7 is a cross section through the rotor of FIG. 1, taken along the line 7—7 of FIGS. 1 and 2.

FIG. 8 is a cross section through the rotor of FIG. 1, taken along the line 8—8 of FIGS. 1 and 2.

FIG. 14 is a section view of the collective toggle spring of the rotor of FIG. 1, taken along line 14—14 of FIG. 12 and shown in zero pitch position.

FIG. 15 is a section view of the collective toggle spring of FIG. 14 at a moderate pitch position.

FIG. 16 is a side view of the spar of the rotor of FIG. 1, showing the collective toggle spring.

FIG. 17 is a section view of the collective toggle spring of FIG. 14 at maximum pitch position.

FIG. 18 shows the structure for an alternate embodiment, a constant chord rotor.

BEST MODE FOR CARRYING OUT THE INVENTION

Figure 9:
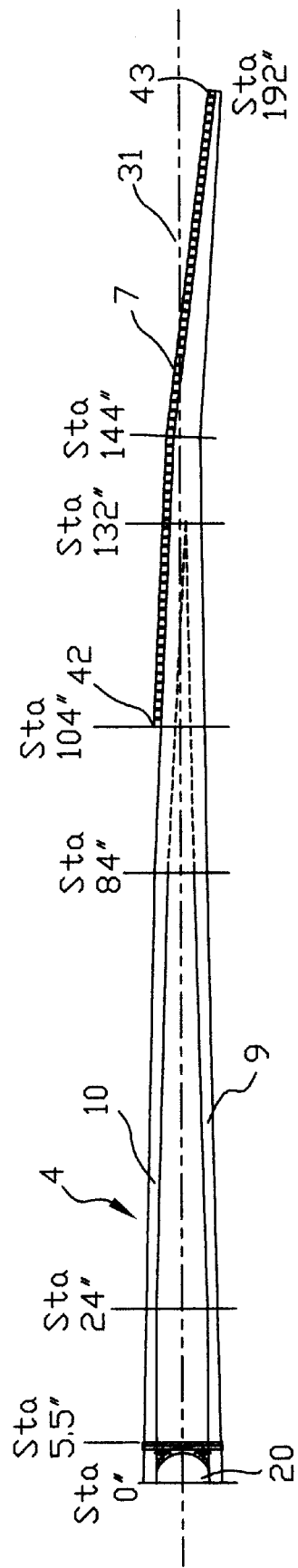
FIG. 9 is a top view of the spar and tip weights only of the rotor of FIG. 1.

Referring to FIG. 1, a cross beam rotor 1 for rotary wing aircraft is shown, comprising blade 2, blade cuff 3, spar 4, mid rib 5, partial rib 6, tip weights 7, and spinner 8. Stations along rotor blade 2 are indicated by numerals. As discussed herein, stations refer to that position measured in inches from the axis of rotation of the rotor 1. Dimensions given are for illustrative purposes only.

Spar 4 has two spar caps or structural members 9,10 extending as one piece from station 192 on the rotor half shown to station 192 on the rotor half not shown. The spar caps 9, 10 are each rectangular in cross section and composed of continuous unidirectional high modulus strands, preferably graphite or S-glass, substantially parallel to the spar span, in an epoxy matrix. Spar 4 has a dual beam cross section in an inner portion of spar 4 from station 5.5 to station 84.5 (see FIGS. 3 and 4), to provide high in-plane stiffness, low out-of-plane stiffness, and low torsional stiffness. Spar 4 has a box-beam section in an intermediate portion of spar 4 from station 84.5 to station 132 (see FIG. 6), to provide high in-plane stiffness, low out-of-plane stiffness, and high torsional stiffness. Spar 4 has a rectangular cross section in an outer portion of spar 4 from station 132 to the blade tip (see FIGS. 7 and 8) where spar caps 9,10 become a single unit. The cross sectional area of the spar decreases only slightly toward the blade tip until station 132 as shown in FIGS. 3 through 7, because most of the rotor weight is in the tips, and the centrifugal force at any station is a function of first, the mass of the rotor blade outboard of said station, and second, the distance from the center of rotation to the center of gravity of said mass.

As shown in FIGS. 3 through 8, blade 2 is constructed of an upper skin 17 forming the upper airfoil surface and a lower skin 18 forming the lower airfoil surface, each skin comprising layers of high modulus fabric in an epoxy matrix in some locations, and in other locations comprising a sandwich structure of high modulus fabric in an epoxy matrix surrounding structural foam. The fabric in the skins 17, 18 includes layers oriented at about a ±45 degree angle to the span, to provide torsional stiffness, and unidirectional layers aligned with the span, to withstand centrifugal force and in-plane and out-of-plane bending. Once the blade skins 17, 18 are bonded together, blade 2 is a torsionally stiff torque tube. Blade 2 is bonded to spar 4 from station 84 to station 192.

Figure 13:
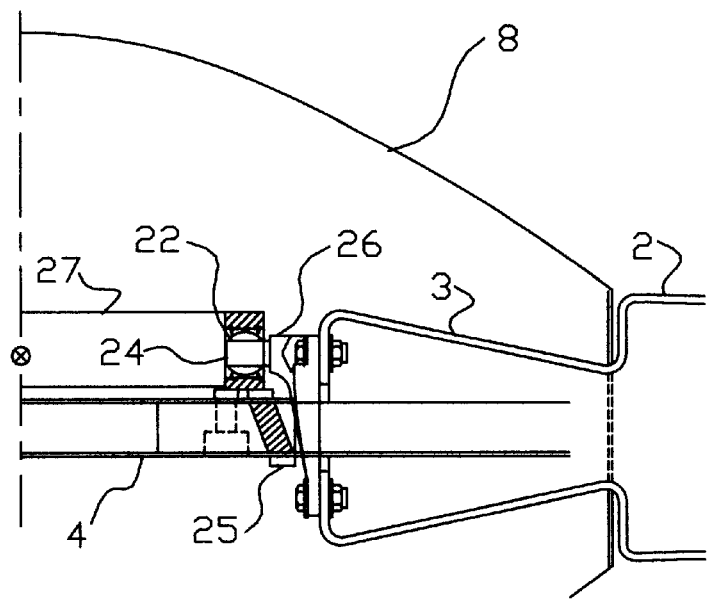
FIG. 13 is an enlarged sectional side view of the root, hub, and spinner of the rotor of FIG. 1, omitting the collective toggle spring.
Figure 12:
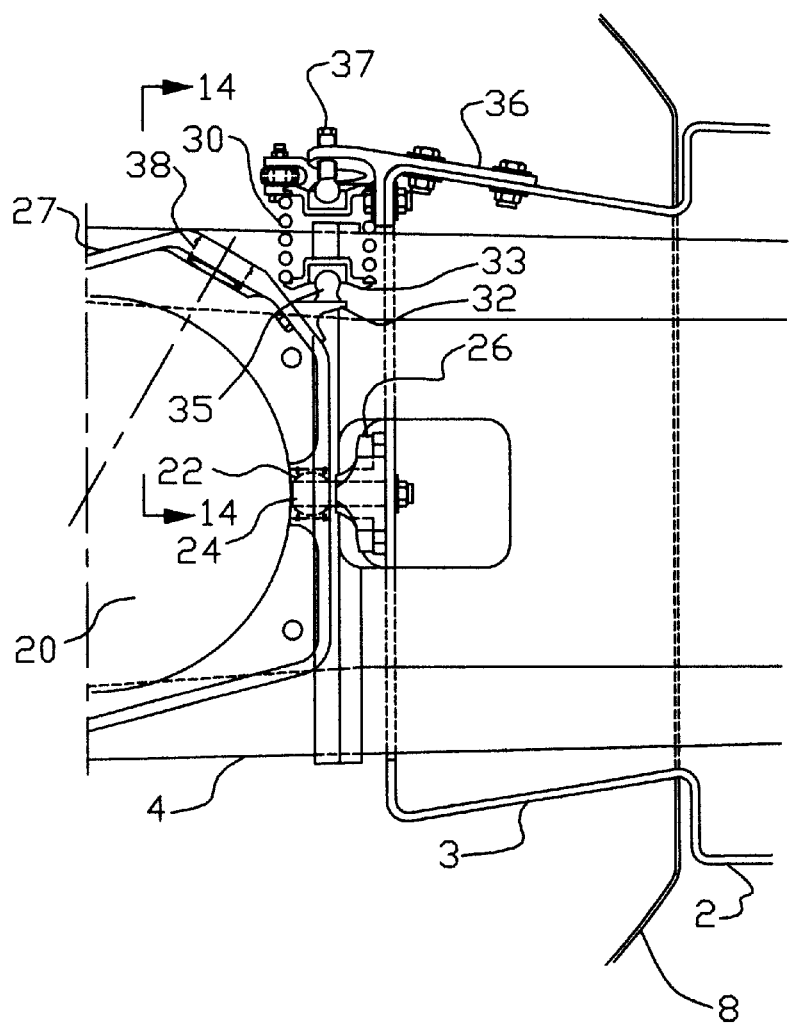
FIG. 12 is a top view sectional view of the root of the rotor of FIG. 1.

Blade cuff 3 is a torque tube at the root end of blade 2 constructed in the same lay-up as blade 2. As best illustrated in FIGS. 12 and 13 blade cuff 3 has a neck to hide the hole in spinner 8 required to allow blade 2 to change pitch, and to streamline the intersection between blade 2 and spinner 8.

Pitch control forces are applied to blade cuff 3, which blade cuff 3 transfers to blade 2. Torsion applied to the end of blade 2 is transferred to mid rib 5 and spar 4 at station 84 where the three are bonded together. The result is that pitch control forces on blade cuff 3 twist spar 4 from station 5 to station 84, changing blade 2 pitch without twisting blade 2.

Still referring to FIG. 1, mid rib 5 at station 84.5 is a fiberglass rib about one-half inch thick, shaped to close the gap between blade skins 17 and 18 around spar 4. Mid rib 5 helps to transfer torsion between blade 2 and spar 4 and provides an end for the bonding region between spar 4 and blade 2. Mid rib 5 is substantially sealed (with only a small bleed hole) to prevent radial air flow which helps reduce air pressurization in the blade tip and the energy absorbed by air flowing radially through blade 2. Partial rib 6 at station 144 reinforces the blade bend at that station. The reasons for this bend are discussed in reference to FIG. 9.

As shown in FIG. 1a, tip weights 7 are preferably depleted uranium or tungsten due to their high density. Tip weights 7 are located at the leading edge between spar 4 and blade 2 to maintain the chordwise center of gravity at the 25% chord to prevent flutter, blade weave, and blade divergence.

FIG. 2 is an isometric cutaway of three portions of the rotor blade 2. Portion 28 shows station 70 to station 98, which includes the transition of spar 4 from the twistable dual beam cross section to the bonded, torsionally stiff box spar cross section. From station 5 to station 84.5, the spar 4 cross section consists of front spar cap 10 and rear spar cap 9 spaced apart from each other, creating a generally dual beam cross section as shown in FIGS. 2–5.

FIG. 6 shows a cross section of the rotor 2 at station 86. Spar caps 9, 10 are still spaced apart from each other. A top shear web 12 is attached to the top of front spar cap 10 and rear spar cap 9 in addition to bottom shear web 11, creating a box beam cross section. The dual beam cross section is much more torsionally flexible than the box beam used from stations 84.5 to station 132.

From station 132 to station 192, the front and rear spar caps 10, 9 meet to form a single rectangular cross section tapering in width and height toward the tip, as illustrated in FIG. 7. Shear webs 11, 12 are bonded to the top and bottom of the rectangle to help carry shear loads between the two spar caps 4. Blade 2 is swept rearward at station 144, as will be discussed later on. FIG. 8 shows a cross section at station 192, where spar 4 is now unitary and small since there is very little mass outboard.

FIG. 3 shows the cross section of cuff 3 at station 5.5. The root end of blade cuff 3 is shaped for convenient attachment of a pitch horn to which pitch control forces can be applied. FIG. 4 shows the cross section of blade 2 and spar 4 at station 12. Blade 2 is generally elliptically shaped at station 12 to provide a streamlined intersection with spinner 8. The large enclosed cross section of blade 2 at the root is advantageous for two reasons. First, it provides high torsional stiffness, since the torsional stiffness of a shell of a given thickness is proportional to the square of its enclosed area. Secondly, the root airfoil has a higher percentage thickness so that it stalls at a higher angle of attack. Since the root of blade 2 has a lower rotational velocity, it typically operates at a higher angle of attack than the blade tips. The oval shape at station 12, however, is not ideal aerodynamically, so it tapers quickly to a normal airfoil section at station 18.

FIG. 5 shows a cross section at station 84.5, where blade 2 and spar 4 are first bonded to each other. At station 84.5, a two-piece mid rib 15,16 joins spar 4 with skins 17 and 18. Upper skin 17 and lower skin 18 between station 12 and station 84.5 are a sandwich structure around structural foam 13. Mid rib 15 fits above shear web 11, and mid rib 16 fits below shear web 11. Mid ribs 15,16 completely fill the space between spar 4 and skins 17 and 18 (except for a small bleed air hole 40), and bonds them together.

FIG. 6 shows a cross section at station 86. At station 84.5, spar 4 cross section becomes a box-beam consisting of spar caps 9 and 10 and shear webs 11 and 12. Blade 2 is bonded to spar 4 from station 84 to station 192 using a bonding mix 19 of epoxy, fumed silica thickening agent, and flexibility agent. This bond transfers all the centrifugal force acting on blade 2 to spar 4. Bonding mix 19 fills the leading edge cavity and bonds spar cap 9 and portions of shear webs 11 and 12 to upper skin 17 and lower skin 18. Shear webs 11 and 12 ensure that spar cap 10 shares the centrifugal load with spar cap 9, even though only spar cap 9 is bonded directly to blade 2.

FIG. 7 shows a cross section at station 132. From station 104–192, tip weights 7 fill the space between spar 4 and the inside leading edge of upper skin 17 and lower skin 18. Bonding mix 19 fills the space between the upper surface of spar 4 and upper skin 17, and between the lower surface of spar 4 and lower skin 18. At station 132, spar caps 9 and 10 meet for the first time, so that spar 4 becomes a single rectangular cross section.

FIG. 8 shows a cross section at station 192, just inside the blade tip. Tip weights 7 still fill the space between spar 4 and the inside leading edge of top skin 17 and bottom skin 18. Bonding mix 19 attaches spar 4 to skins 17 and 18. The extreme tip of each blade 2 has a vent hole 44 for the escape of air compressed by centrifugal force and any moisture that might accumulate inside and otherwise unbalance the rotor.

FIG. 9 shows a top view of spar 4, showing the two spar caps 9 and 10, and the hole 20 at the axis of rotation. In the preferred embodiment, both spar caps 9, 10 are laid up in a single mold and a single cure, so that from station 132 to station 192 spar 4 is one unit. The spar cross sectional area is decreased toward the tip by decreasing the number of strands. Spar caps 9 and 10 are a constant 1 inch thick from station 0 to station 5.5, and taper linearly in thickness from 1 inch at station 5.5 to 0.23 inch at station 192. The spar caps get wider linearly from station 5.5 to 132 to compensate for the taper in thickness.

The planform of spar 4 is shown in FIG. 9. From station 84 to 192 the front edge of spar 4 parallels the leading edge of blade 2. The spar platform is slightly swept at station 84, because from station 5.5 to station 84 spar 4 must have clearance from the inside of blade 2 since spar 4 twists during pitch changes. Spar 4 is centered in blade 2 at station 12 by spherical bearing 22 (FIG. 12), but at all outboard stations the spar is moved as far forward as possible to reduce bending moments caused by tip weights 7 and to put the spar twist axis near the blade aerodynamic center.

Spar 4 is swept at station 144, in order to further reduce the spar stresses caused by heavy tip weights 7. It is well known that the rotor blade must be mass balanced around the quarter chord to prevent flutter, blade weave, and blade divergence. Therefore any tip mass installed to increase inertia must be located in the leading edge, ahead of spar 4. In an unswept blade, tip mass ahead of the spar creates an in-plane bending moment due to centrifugal force, which results in high tensile loads at the blade leading edge and compressive loads at the blade trailing edge. Sweeping approximately the outboard 15–35 percent of the rotor blade rearwards approximately 3 to 13 degrees has no significant aerodynamic effect but moves the tip mass rearwards, thereby reducing both the tensile and compressive in-plane bending loads. The stress at any station in the blade is the sum of stresses caused by the centrifugal force and bending moments of all masses from said station to the blade tip (where moments are measured around the blade neutral axis at the radius of said station). Because of tip sweep, a line 31 drawn in a top view (FIG. 9) through the structural center of an inboard portion of blade 2 passes behind inboard weight 42 of tip weights 7 but in front of the outboard weight 43 of tip weights 7. Therefore the moment of weight 42 approximately cancels the moment of weight 43, everywhere in the spar inboard of weight 42. The sweep angle and length of the swept blade section is selected to result in the lowest peak stress in blade 2, including the entire blade, not just the locations inboard of the weights 7. Blade tip sweep can result in at least a 33 percent reduction in tensile stress in the leading edge and can eliminate compressive loads in the trailing edge since blade 2 is also under tensile stress due to centrifugal force.

Figure 11:
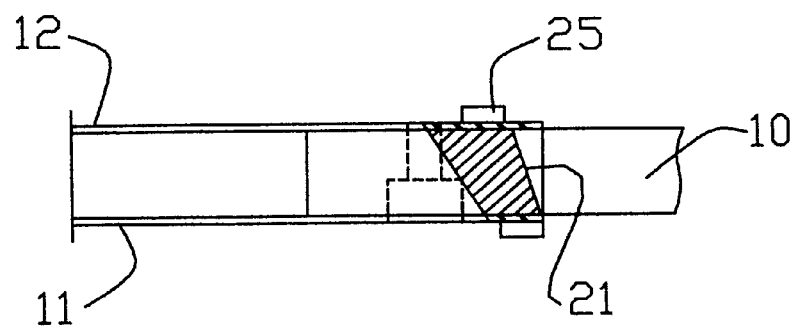
FIG. 11 is a spanwise cross section of the spar center section of the rotor of FIG. 1.
Figure 10:
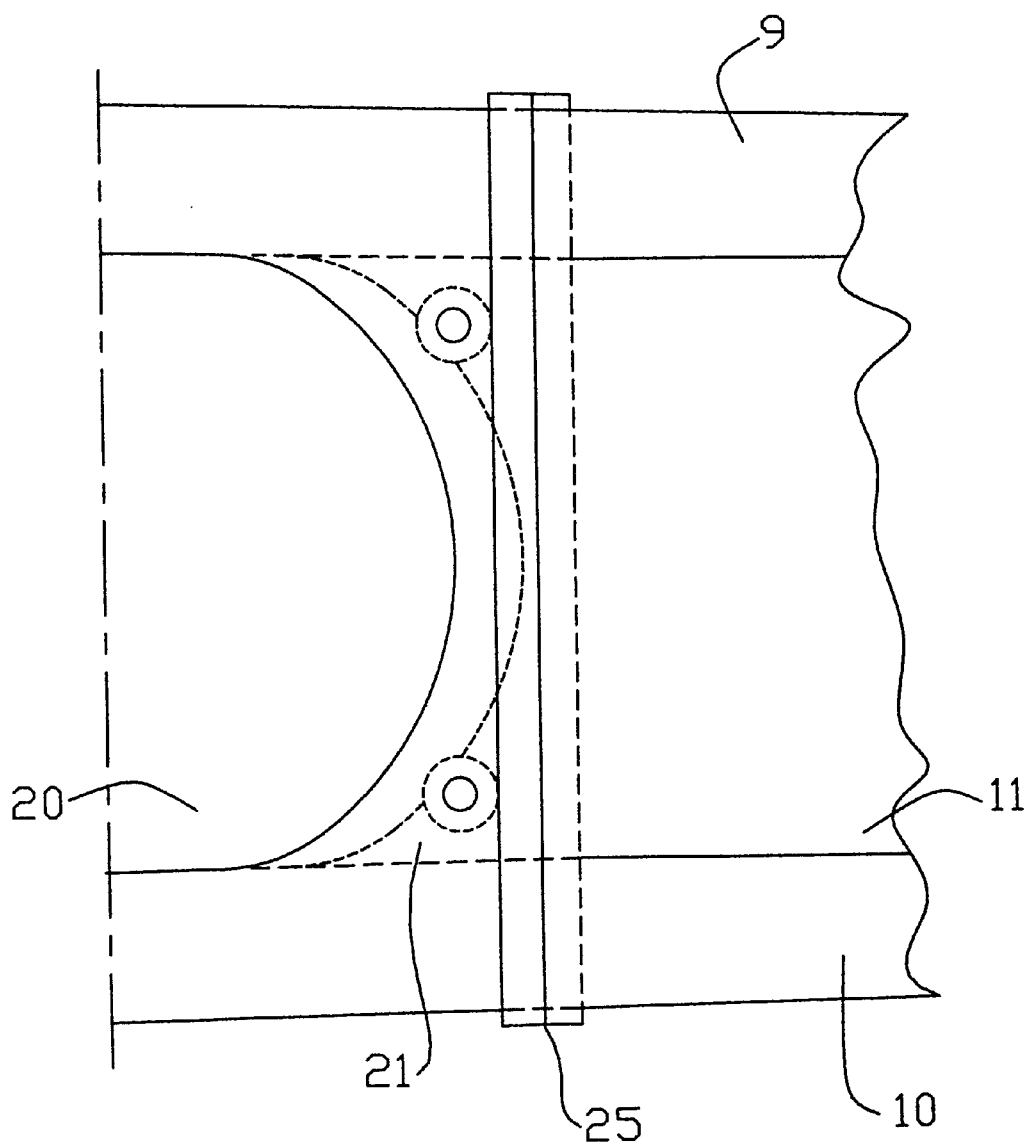
FIG. 10 is an enlarged partial top view of the spar center section of the rotor of FIG. 1.

FIG. 10 shows an enlarged top view of the rotor spar center section without the aluminum hub, and FIG. 11 is a side view of the rotor spar center section. Hole 20 at the center of rotation is formed by bonding a bridge 21 (made of high modulus fibers in a matrix) between spar caps 9 and 10. Bridge 21 is the same thickness as spar caps 9 and 10, and contains holes for mounting an aluminum hub 27 (FIGS. 12 and 13). Spar caps 9 and 10 pass without interruption on either side of hole 20, so centrifugal force is carried without a stress concentration. The mounting of bridge 21 is reinforced by shear webs 11 and 12 on both sides, and by circumferential windings 25 made of high modulus unidirectional fibers in a matrix. No shear web is needed between spar caps 9 and 10 from stations 5.5 to 84 because bridges 21, shear webs 11 and 12, circumferential windings 25, and the aluminum hub 27 are sufficient to carry the shear forces.

FIG. 12 shows a top view of the rotor center section, showing aluminum hub 27 and collective toggle spring 30, which eliminates backlash and reduces control forces in the collective control system. Collective toggle spring 30 could be a compressed coiled spring or a compressed stack of alternately oriented Belleville washers, one end of which is pivotably attached on the rotor blade cuff 3 and the other end of which is pivotably attached to the rotor hub 27. At low pitch (FIG. 14), where spar twist is too low to provide enough moment to eliminate backlash in the collective control linkage, collective toggle spring 30 applies a moment around spar 4 tending to decrease blade pitch, which applies a force to the linkage, which removes backlash all the way to the pilot's collective stick. At moderate pitch (FIG. 15), spar twist is sufficient to remove backlash in the control linkages, and control forces are moderate, so collective toggle spring 30 exerts no moment around the spar or force through the control linkage because spring 30 acts directly through the axis of twist A of blade 2 at pin 24. At high pitch (FIG. 17), collective toggle spring 30 exerts a moment around spar 4 tending to increase blade pitch, which applies a force to the linkage in order to reduce pilot control force, partially counteracting the spar twist which in combination with centrifugal force would otherwise result in too high control forces. By positioning the pivot points and changing the spring rate and preload, the collective toggle spring can assist in providing approximately the desired collective control forces throughout the collective travel. FIGS. 14, 15, and 17 shows in detail how collective toggle spring 30 accomplishes these goals.

FIG. 13 shows a side view of the rotor center section with aluminum hub 27 but without collective toggle spring 30. Rotor hub 27 is a machined aluminum ring with flanges for rigidly bolting to spar 4, with mounting means for spherical bearing 22, and with bearing holes 38 (FIG. 12) for the rotor spindle. Rotor hub 27 is mounted to a rotor drive shaft (not shown) for rotation therewith. Spherical bearing 22 is mounted in rotor hub 27, and slides freely on a pin 24 held by bracket 26 which is bolted to blade cuff 3. Spherical bearing 22 allows blade 2 to change pitch relative to spar 4 and to bend either in-plane or out-of-plane without exerting a bending moment on spar 4. Since spherical bearing 22 slides on pin 24 along the span of rotor blade 2, no centrifugal force is carried through spherical bearing 22. Rather, centrifugal force is transmitted through spar 4 at the hub from blade to blade without being transmitted to hub 27.

FIG. 14 shows a section through collective toggle spring 30, showing its position at zero blade pitch. Ball 35 is welded to bracket 32, which is attached to rotor hub 27, which is bolted to rotor spar 4. Spring cap 33 rides pivotably on ball 35 such that spring cap 33 is approximately perpendicular to the centerline of collective toggle spring 30. Another spring cap 34 and ball 37 bolted to pitch horn 36 constrains the other end of collective toggle spring 30. FIG. 16 shows a side view of the collective toggle spring 30, rotor hub 27, pitch horn 36, and blade cuff 3. Pitch horn 36 is rigidly mounted to a side of cuff 3 by bolts. The pitch horn clevis 39 is attached to the pitch control linkage (not shown in FIG. 16). Movement of clevis 39 generally upward and downward by the pilot control linkage causes pitch change of blade 2 about pivot pin 24 (axis A). This movement, however, is affected by spring 30 because one end of spring 30 is pivotally mounted to hub 27, which does not move in response to movement of the pilot control linkage.

As shown in FIG. 14, at zero blade pitch position, collective toggle spring 30 applies a force towards reduced blade pitch because its centerline 41 through balls 35,37 passes above the axis of pitch change A, which is at pin 24 (FIG. 12). Spring centerline 41 is substantially perpendicular to the span of blade 2. In FIG. 15, rotor blade 2 is at moderate pitch, and the centerline 41 through balls 35,37 passes through axis of pitch change A so that collective toggle spring 30 provides no force affecting pitch control. In FIG. 17, rotor blade 2 is at maximum pitch, and the centerline 41 through balls 35,37 passes below axis of pitch change A so that collective toggle spring 30 provides a force toward greater pitch.

An alternate embodiment, a constant chord rotor, is shown in FIG. 18. The front spar cap 10' and rear spar cap 9' of the rotor spar are widely separated and taper in cross section toward the tip to maintain the same level of centrifugal force-induced stress. In-plane bending loads are carried between front spar cap 10' and rear spar cap 9' from mid rib 5' to the tip by top and bottom shear webs 11' and 12'. Like the preferred embodiment described earlier, the tip of the constant-chord rotor could be swept to reduce in-plane bending stresses caused by the tip weights.

Constant chord rotors are often used on helicopters because the top speed is significantly affected by the tip chord. At high aircraft forward speed, inboard portions of the retreating blade are stalled and provide little lift, so only the tip of the retreating blade will be providing lift. Since the advancing and retreating blades must provide equal lift moments around the rotor head, the advancing blade can only provide as much lift as the retreating blade.

But constant chord rotors have several disadvantages. Centrifugal force asserts a pitching moment toward flat pitch which is much higher for a constant chord spar than for a tapered spar. This leads to higher collective control forces. Also, in the blade section that surrounds the twistable spar section, through which pitch control forces and spar twisting forces are applied, torsional stiffness is more difficult to achieve in a constant chord rotor than in a tapered rotor. Tapering allows for a larger cross sectional extent near the root, and the torsional stiffness of a hollow cross section of a given thickness is proportional to the square of its enclosed area.

The invention has significant advantages. The dual beam cross section provides high in-plane stiffness with low weight and low out-of-plane stiffness. The cross section enables the rotor spindle and controls to pass through a central hole between the spar caps without a stress concentration. The swept back outboard leading edge reduces stress in the rotor. The toggle spring arrangement provides responsive collective control without slop.

The invention is not limited to the preferred embodiments described above; on the contrary the invention extends to any variant that reproduces the above-described essential characteristics by equivalent means.

I claim:

1. A flex-beam rotor for rotary wing aircraft, having an inner portion outboard of the rotor axis of rotation, and intermediate and outer portions outboard of the inner portion, the rotor comprising:

two spar caps extending continuously from tip to tip, the spar caps being separated at the rotor axis of rotation and throughout the intermediate portion of the rotor and joined to each other throughout the outer portion of the rotor; and a blade on each side of the rotor axis of rotation, each of the blades being mounted to and enclosing the spar caps throughout the inner, intermediate, and outer portions of the rotor.

2. The rotor as in claim 1, wherein the spar caps have opposed sides which are spaced apart from each other in the inner portion of the rotor, which converge toward each other in the intermediate portion of the rotor and contact each other in the outer portion of the rotor.

3. The rotor as in claim 1, wherein the spar caps have opposed sides which contact each other in the outer portion of the rotor, forming a unitary member.

4. A flex-beam rotor for rotary wing aircraft, having an inner portion outboard of the rotor axis of rotation, and intermediate and outer portions outboard of the inner portion, the rotor comprising:

two spar caps extending continuously from tip to tip, the spar caps separated at the rotor axis of rotation and joined to each other in the intermediate portion by an upper shear web on top of the spar caps and a lower shear web on the bottom of the spar caps and throughout the outer portion of the rotor; and a blade on each side of the rotor axis of rotation, each of the blades being mounted to and enclosing the spar caps.

5. A flex-beam rotor for rotary wing aircraft, having an inner portion outboard of the rotor axis of rotation, and intermediate and outer portions outboard of the inner portion, the rotor comprising:

two spar caps extending continuously from tip to tip, the spar caps separated at the rotor axis of rotation and joined to each other throughout the outer portion of the rotor and having opposed sides which are spaced apart from each other in the inner portion and intermediate portion of the rotor and contact each other in the outer portion;

upper and lower shear webs connecting the top and the bottom of the spar caps in the intermediate portion to form a box cross section; and a blade on each side of the rotor axis of rotation, each of the blades being mounted to and enclosing the spar caps.

6. A flex-beam rotor for rotary wing aircraft comprising:

a spar having two spar caps extending continuously from blade tip to blade tip, the spar caps being separated at the rotor axis of rotation and an inner portion of the rotor, the separation of the spar caps gradually decreasing in an intermediate portion of the rotor, the spar caps being joined to each other throughout an outer portion of the rotor;

upper and lower shear webs connecting the top and the bottom of the spar caps in the intermediate portion to form a box cross section; and a pair of rotor blades each enclosing the spar on each side of the axis of rotation, wherein in the inner portion of the rotor, each of the blades is free of connection with the spar to enable twisting of the spar for pitch change, and wherein in the intermediate and outer portions of the blades, the blades are bonded to the spar.

7. A flex-beam rotor for rotary wing aircraft, having a rotor axis of rotation, the rotor assembly comprising:

two spar caps extending continuously from tip to tip, the spar caps separated at the rotor axis of rotation and throughout an intermediate portion of the rotor and joined to each other throughout an outer portion of the rotor;

a blade on each side of the rotor axis of rotation, each of the blades being mounted to and enclosing the spar caps throughout the inner, intermediate, and outer portions of the rotor, each of the blades being joined to the rotor in the outer portion and being hollow and free of connection to the spar caps in an inner portion of the rotor to enable pitch changes of each of the blades relative to the rotor axis of rotation;

a rotor hub rigidly mounted to the spar caps;

each of the blades being pivotally mounted to the rotor hub about a pivot point allowing twisting of an inner portion of each of the spars relative to the hub for pitch change; and a collective control linkage mounted between the rotor hub and an edge of the blade for causing the spar to twist and the blades to change pitch.

8. The rotor assembly according to claim 7, wherein the collective control linkage for each of the blades comprises:

a compressed spring, the spring having first and second ends, the first end being pivotably attached to the rotor blade, the second end being carried by the spar for pivotal movement relative to the hub and the spar;

the spring ends being attached such that at low pitch the spring applies a moment tending to decrease blade pitch, at moderate pitch the spring exerts no significant moment, and at high pitch the spring applies a moment tending to increase blade pitch.

9. The rotor assembly according to claim 8, wherein the spring has a centerline which extends from one of the ends to the other of the ends transverse to a span of the blades; and wherein at low pitch, the centerline passes above the pivot point of the blade, at moderate pitch, the centerline passes through the pivot point of the blade, and at high pitch, the centerline passes below the pivot point of the blade.

10. The rotor assembly according to claim 8, wherein the spring comprises a coil spring having a centerline which is substantially perpendicular to a span of the blade.

11. A flex-beam rotor for rotary wing aircraft, having a rotor axis of rotation, the rotor assembly comprising:

two spar caps extending continuously from tip to tip, the spar caps separated at the rotor axis of rotation and joined to each other throughout an outer portion of the rotor;

a blade on each side of the rotor axis of rotation, each of the blades being mounted to and enclosing the spar caps, each of the blades being joined to the rotor in the outer portion and being hollow and free of connection to the spar caps in an inner portion of the rotor to enable pitch changes of each of the blades relative to the rotor axis of rotation;

a rotor hub rigidly mounted to the spar caps;

each of the blades being pivotally mounted to the rotor hub about a pivot point allowing twisting of an inner portion of each of the spars relative to the hub for pitch change, the pivot point having a spherical bearing in engagement with a rod which is mounted between the rotor blade and the rotor hub, the rod and bearing being rotatable relative to each other; and a collective control linkage mounted between the rotor hub and an edge of the blade for causing the spar to twist and the blades to change pitch.

12. A flex-beam rotor assembly for rotary wing aircraft, having a rotor shaft rotated about a rotor axis of rotation, the rotor assembly comprising:

a hub mounted to the rotor shaft for rotation therewith;

a blade on each side of the rotor axis of rotation, caps, each of the blades having an inner portion which is pivotally mounted to the hub about a pivot point to enable limited rotation of each of the blades relative to the hub to change pitch;

a compressed spring for each of the blades, the spring having first and second ends, the first end being pivotably attached to the rotor blade, the second end being pivotally carried by the hub;

a pitch horn attached to the second end of the blade to selectively rotate the blade about the pivot point to change the pitch; and wherein the spring ends are attached such that at low pitch the spring applies a moment tending to decrease blade pitch, at moderate pitch the spring exerts no significant moment, and at high pitch the spring applies a moment tending to increase blade pitch.

13. The rotor assembly according to claim 12, wherein the spring has a centerline which extends from one of the ends to the other of the ends transverse to a span of the blades; and wherein at low pitch, the centerline passes above the pivot point of the blade, at moderate pitch, the centerline passes through the pivot point of the blade, and at high pitch, the centerline passes below the pivot point of the blade.

14. The rotor assembly according to claim 12, wherein the spring comprises a coil spring having a centerline which is substantially perpendicular to a span of the blade.

\* \* \* \* \*

UNITED STATES PATENT AND TRADEMARK OFFICE
CERTIFICATE OF CORRECTION

PATENT NO.    : 6,024,325  Page 1 of 1
DATED         : February 15, 2000
INVENTOR(S)   : Jay W. Carter, Jr.

It is certified that error appears in the above-identified patent and that said Letters Patent is hereby corrected as shown below:

<u>Column 1,</u>
Line 5, after the first paragraph, please insert the following paragraph:
-- This invention was made with Government support under contract number NAS2-99090 awarded by NASA. The Government has certain rights in the invention. --

Signed and Sealed this

Eighth Day of April, 2003

JAMES E. ROGAN
*Director of the United States Patent and Trademark Office*